(12) United States Patent
Piesinger

(10) Patent No.: US 8,038,166 B1
(45) Date of Patent: Oct. 18, 2011

(54) TRAILER HITCHING AND BACKING PRECISION GUIDANCE SYSTEM METHOD AND APPARATUS

(76) Inventor: Gregory Hubert Piesinger, Cave Creek, AZ (US)

(*) Notice: Subject to any disclaimer, the term of this patent is extended or adjusted under 35 U.S.C. 154(b) by 174 days.

(21) Appl. No.: 12/462,683

(22) Filed: Aug. 8, 2009

Related U.S. Application Data

(60) Provisional application No. 61/188,632, filed on Aug. 11, 2008.

(51) Int. Cl.
*B60D 1/36* (2006.01)
*G01C 23/00* (2006.01)
(52) U.S. Cl. ........................ 280/477; 340/431; 340/686.2
(58) Field of Classification Search .................. 280/477; 340/431
See application file for complete search history.

(56) References Cited

U.S. PATENT DOCUMENTS

| | | | |
|---|---|---|---|
| 6,178,650 B1* | 1/2001 | Thibodeaux | 33/286 |
| 6,900,724 B2* | 5/2005 | Johnson | 340/431 |
| 7,057,498 B1* | 6/2006 | Cook et al. | 340/431 |
| 2005/0285371 A1* | 12/2005 | Ramsey et al. | 280/477 |
| 2007/0132560 A1* | 6/2007 | Nystrom et al. | 340/431 |
| 2007/0205581 A1* | 9/2007 | Wilcox | 280/477 |
| 2010/0013188 A1* | 1/2010 | Ortmann et al. | 280/477 |

\* cited by examiner

*Primary Examiner* — Tony H. Winner
*Assistant Examiner* — Wesley Potter

(57) ABSTRACT

A target unit mounted on vehicle hitch ball contains a known object target and an optical unit mounted on trailer hitch socket contains an optical sensor. A real image of known object target is projected onto image plane of optical sensor. Vehicle hitching distance and offset from optical axis, normal to image plane origin, is related to real image size and offset from image plane origin respectively. Distance and offset are displayed to driver in the form of remaining distance and relative steering commands.

20 Claims, 15 Drawing Sheets

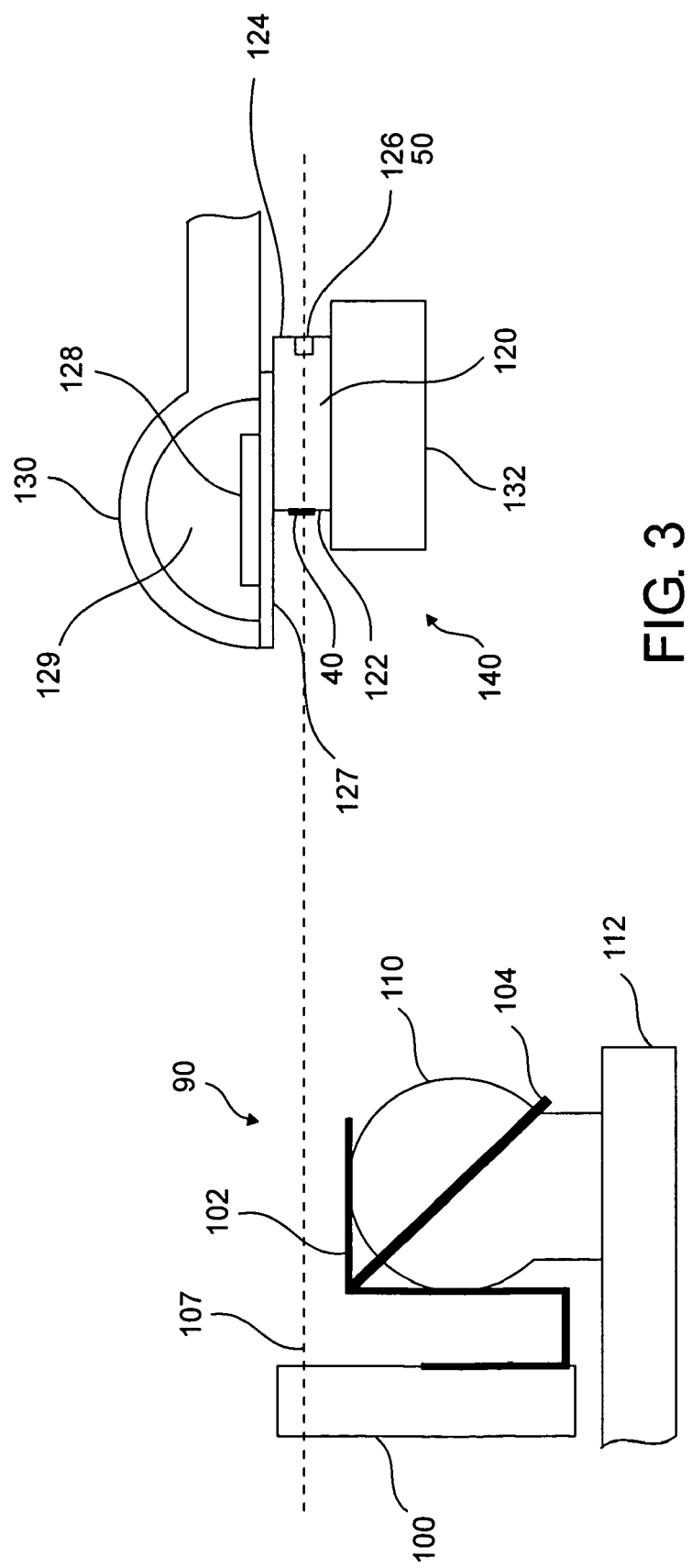

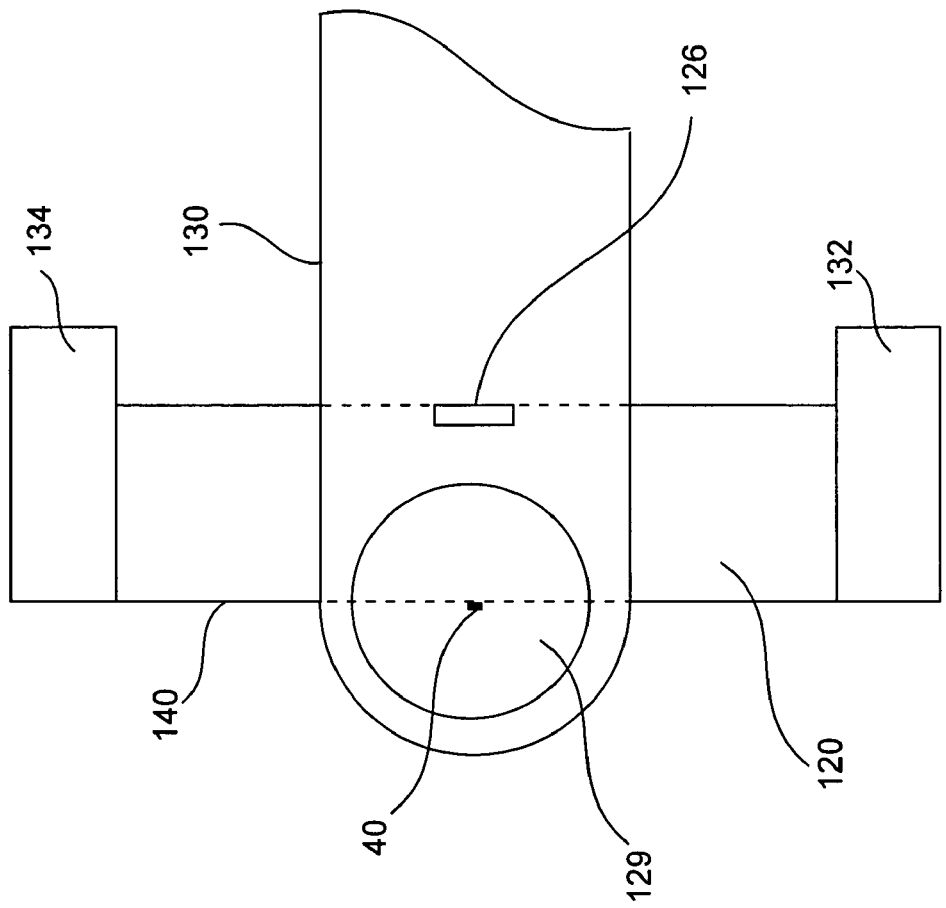
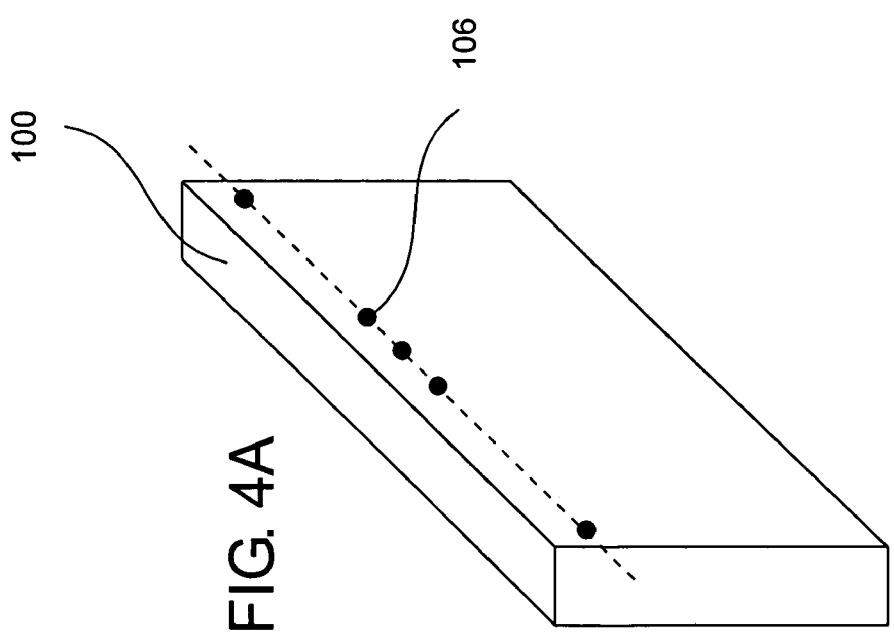
FIG. 4B
FIG. 4A

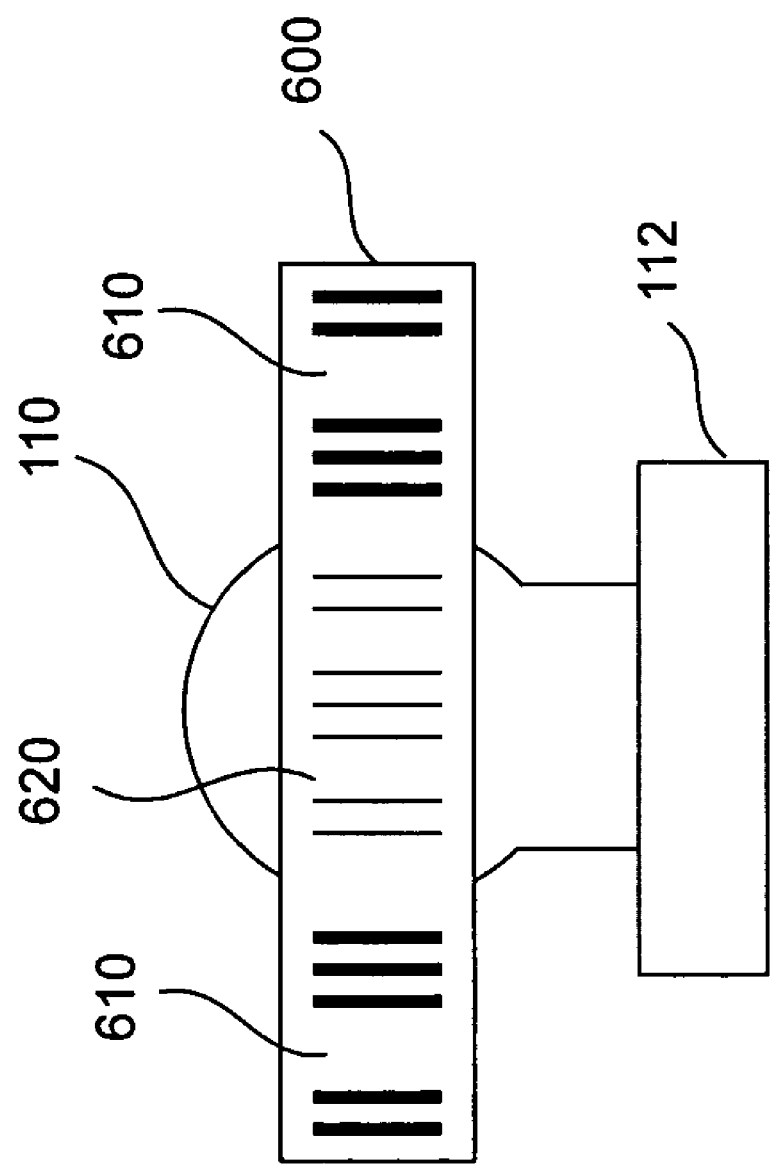

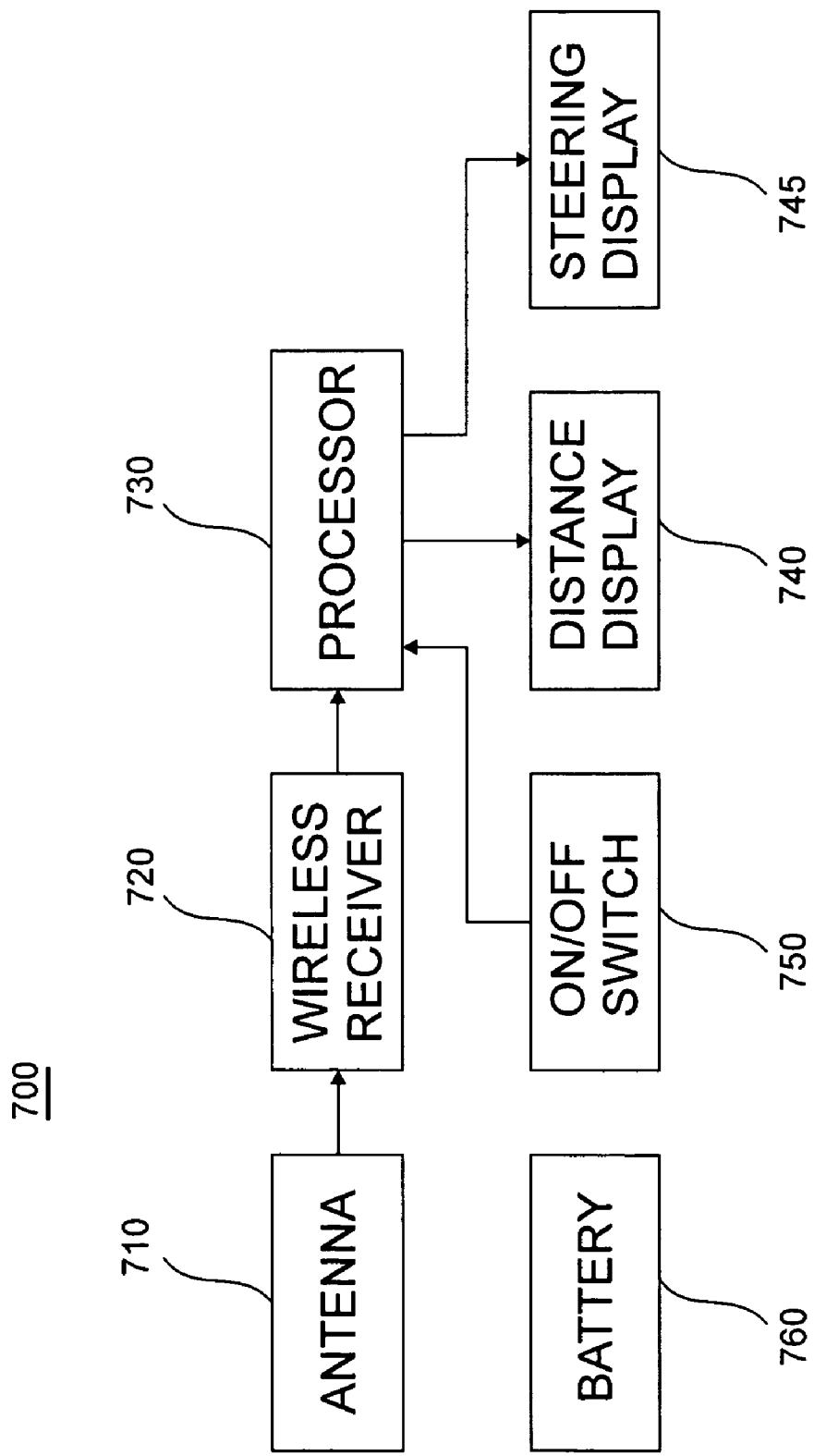

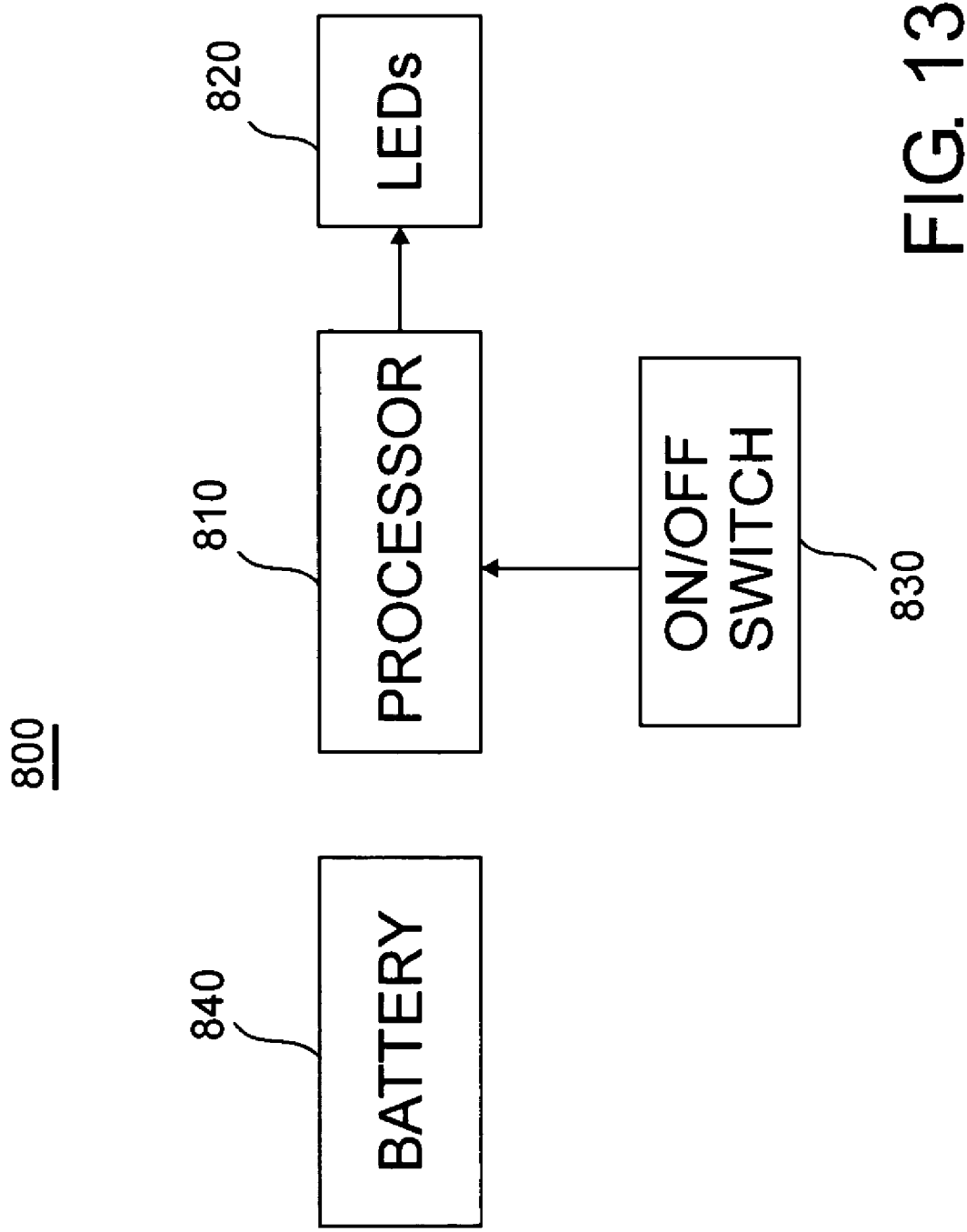

TRAILER HITCHING AND BACKING PRECISION GUIDANCE SYSTEM METHOD AND APPARATUS

RELATED INVENTION

The present invention claims priority under 35 U.S.C. §119 (e) to: "Trailer Hitching and Backing Precision Guidance System," Provisional U.S. Patent Application Ser. No. 61/188,632, filed 11 Aug. 2008, which is incorporated by reference herein.

TECHNICAL FIELD OF THE INVENTION

The present invention relates to trailer hitch alignment aids that assist backing the vehicle hitch ball into alignment with the trailer hitch socket and assist in backing up a hitched trailer.

BACKGROUND OF THE INVENTION

Standard trailer hitches include a socket on the tongue of a trailer which connects to a ball mounted on the towing vehicle. The driver must back the vehicle until the trailer hitch socket is directly above the ball. Since the driver cannot see the ball and socket while driving, backing up correctly so that the ball and socket are in alignment is a difficult trial and error procedure.

Many devices have been postulated to assist the driver in this endeavor. Most consist of fairly simple mechanical visual aids. Others include electronic displays, transmitters and receivers, or camera based systems that indicate the relative alignment of the hitch ball and socket. A few claim to give the driver steering information. Many of these different techniques are summarized in U.S. Pat. No. 7,568,716 which describes a large number of existing patents.

Unfortunately, all prior art hitching aids have a number of limitations. Many must be permanently installed on the vehicle or trailer, many are complicated or expensive, and none give high precision steering guidance to the driver or assist in backing up a hitched trailer.

Accordingly, there is a need for a simple, low cost, portable, universal, precision hitching guidance system for both hitching up a trailer and backing up a hitched trailer.

SUMMARY OF THE INVENTION

In accordance with the present invention, a trailer hitching guidance system is presented that gives the driver precision steering information as the driver backs towards the trailer. The system is small, low cost, portable, universal, and simple to setup and use.

Briefly, to achieve the desired object of the present invention, optical parallax is used to measure distance and alignment between the vehicle and the trailer. To create the parallax, a known target object size is placed near the vehicle hitch ball and an optical sensor is placed near the trailer hitch socket. As the vehicle backs towards the trailer, the size and centering of the projection of the known target object on the optical sensor indicates the distance and position of the vehicle hitch ball with respect to the trailer hitch socket.

Circuitry associated with the optical sensor calculates the distance and centerline deviation of the vehicle from the trailer. This information is sent to a driver display unit via wireless transmission. The display unit informs the driver of the remaining back up distance and commands the proper steering direction and intensity to remain on a centerline for hitch ball and hitch socket alignment.

In one embodiment of the invention, the known target object consists of a horizontal light bar containing a series of lights of known spacing and a linear optical sensor or camera sensor.

In another embodiment, the known target object consists of a passive object of known size, color, and shape and the optical sensor consists of a camera sensor.

In another embodiment, the known target object consists of the vehicle hitch ball itself and the optical sensor consists of a camera sensor.

The primary object of the present invention is to provide simple precision guidance instructions to the driver so that any driver can align the hitch ball and socket to within approximately one-quarter inch without the need to exit the vehicle periodically to check alignment progress.

Another object is to provide an indication of the remaining back up distance to the driver during the hitching maneuver.

Another object is to provide relative steering commands to the driver during the hitching maneuver.

Another object is to provide the capability for the driver to approach the trailer from other than a straight angle.

Another object is to provide a precision guidance apparatus that is small, low cost, portable, and can be quickly and easily applied to all standard ball and socket towing vehicles and trailers.

A further object is to provide relative steering commands and remaining back up distance to the driver when backing up a hitched trailer.

Other objects and advantages of the present invention will become obvious as the preferred embodiments are described and discussed below.

BRIEF DESCRIPTION OF THE DRAWINGS

FIG. 3 illustrates a target unit mounted on the hitch ball and an optical unit mounted under the hitch socket.

FIG. 4 illustrates additional details of the light bar unit and optical unit.

FIG. 10 illustrates a bar code known target object mounted on the hitch ball.

FIG. 12 illustrates a block diagram of the driver display unit.

FIG. 13 illustrates a block diagram of the light bar unit.

DETAILED DESCRIPTION OF THE PREFERRED EMBODIMENTS

Figure 1:
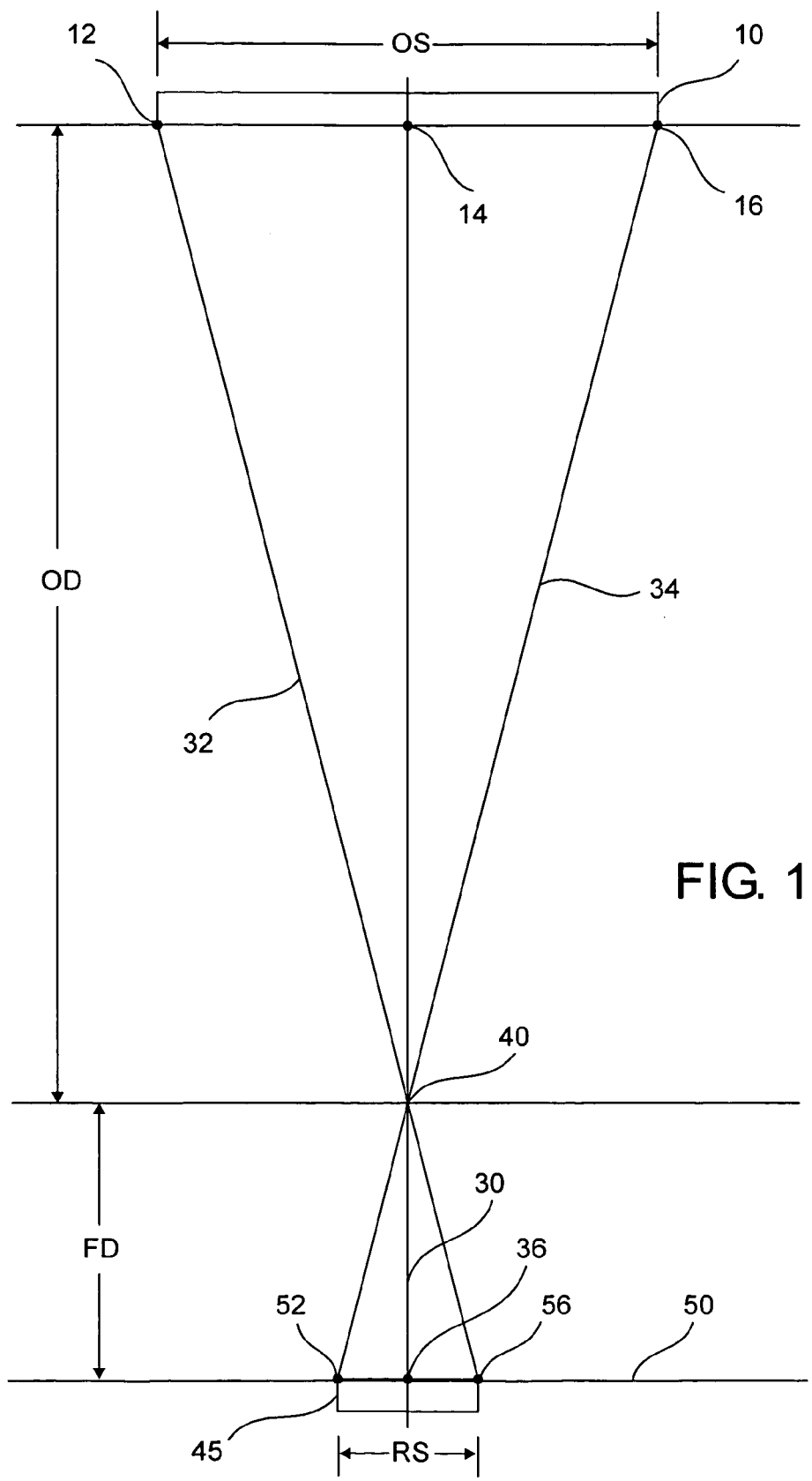
FIG. 1 illustrates a known target object at distance OD in front of an optical center and its projected real image on an image plane at distance FD behind the optical center.

The basic concept of the present invention can be illustrated using FIG. 1. FIG. 1 depicts a known target object 10 situated at distance OD from optical center 40. Optical center 40 is situated at focal distance FD from image plane 50. Optical axis 30 is normal to origin 36 of image plane 50. Center point 14 of known target object 10 is assumed to be on optical axis 30.

The width RS of real image 45 projected on image plane 50 can be found by projection lines drawn from points on known target object 10 to points on image plane 50 such that all projection lines pass through optical center 40. For example, left projection line 32 is drawn from leftmost point 12 of known target object 10 to create real image point 56. Likewise, right projection line 34 is drawn from rightmost point 16 to create real image point 52.

Optical center 40 can be created by placing a pinhole, vertical slit, or lens at point 40. As is well known by anyone familiar with optical ray tracing, distance OD of known target object 10 from an ideal optical center 40 can be determined based on distance FD of image plane 50 from optical center 40, size RS of real image 45, and size OS of known target object 10. Specifically, OD is equal to OS times FD divided by RS.

The real image points 52 and 56 can also be thought of as an illustration of parallax where the background viewed (known target object 10) behind optical center 40 appears different when seen from viewpoints 52 and 56. Determining distance OD is similar to distance measurements by parallax which is a common well known technique for measuring large distances in astronomy.

Figure 2:
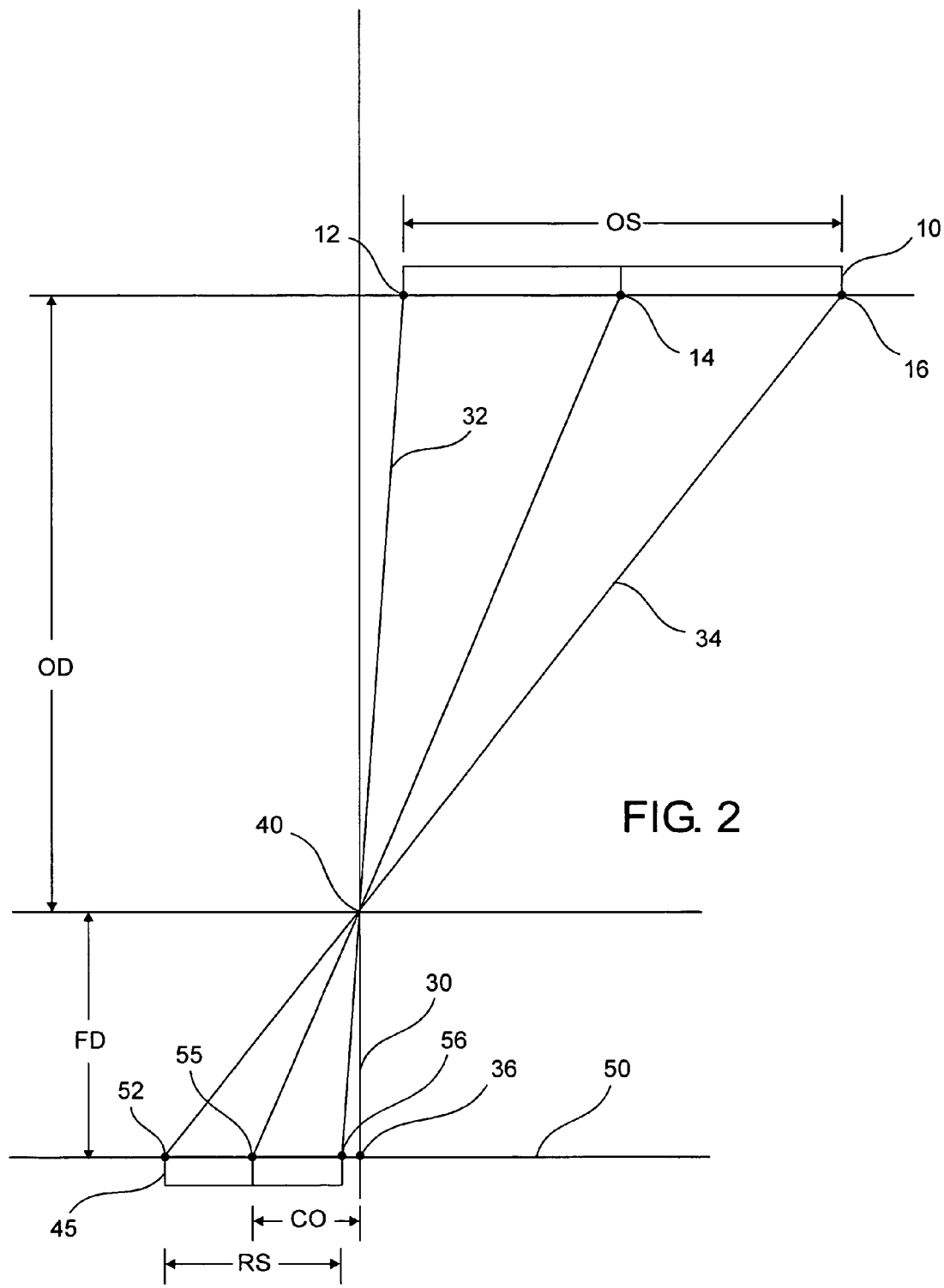
FIG. 2 illustrates the known target object and its projected real image when the known target object is closer to and offset from the optical center.

FIG. 2 depicts the situation when known target object 10 moves closer and is offset from optical axis 30. Size RS of real image 45 is now larger and its center 55 is offset CO from origin 36 of optical axis 30 on image plane 50.

In the preferred embodiment, the trailer hitching precision guidance system will be implemented by placing known target object 10 of known size close to the vehicle hitch ball and optical center 40 close to the trailer hitch socket. The distance OD will be displayed to the driver to indicate the remaining back up distance. A relative steering command based on distance OD and offset CO will be displayed to the driver to command the driver to steer in the proper direction, and with the correct intensity, to intercept and remain on the centerline of optical axis 30. When the displayed distance is zero and neutral steering is commanded, the driver will know that the vehicle hitch ball is situated directly under the trailer hitch socket.

Note that this invention provides precision steering and alignment guidance information because the size RS of real image 45 and offset CO of real image 45 from optical axis 30 increases as the towing vehicle approaches the trailer. Therefore, the accuracy of alignment measurements increase where accuracy is most needed. That is, when the ball and socket are close to alignment.

The steering guidance information will give relative steering commands based on the current steering command and vehicle response. If a slight turn is commanded and the vehicle is not responding sufficiently, a command will be given to increase the intensity of the turn. Likewise if the vehicle is over responding to the turn command, a less intense turn or even a slight turn in the opposite direction will be given. In this way, the turn command will be automatically compensated for the driver's and vehicle's actual response to a steering command. This is important because short vehicles will turn more aggressively for a fixed turn of the steering wheel than will long vehicles.

This type of precision steering guidance information is not provided or possible in current art because current art does not provide a method of obtaining the precision distance and offset information required to produce precision steering guidance.

FIG. 3 illustrates one embodiment of the present invention. Portable target unit 90, composed of known target object 10 contained in light bar unit 100, is mounted to hitch ball 110 using bracket 102 and hold down spring 104. Hitch ball 110 is mounted to vehicle tow mount 112. Optical center 40 and image plane 50 are contained in sensor bar 120 which is mounted under trailer hitch socket 129 of trailer hitch 130 using bracket 127 and magnet 128.

Portable optical unit 140 contains optical center 40 positioned near the front surface 122 of sensor bar 120. Optical sensor 126 is mounted near back surface 124 of sensor bar 120. The photosensitive surface of optical sensor 126 defines image plane 50. Line of sight 107 indicates the light path from known target object 10 through optical center 40 to image plane 50.

A perspective view of light bar unit 100 is illustrated in FIG. 4A. Known target object 10 consists of a horizontal row of lights 106 which are positioned slightly behind hitch ball 110 using bracket 102. Light bar unit 100 contains a battery and circuitry to illuminate row of lights 106.

A top view of trailer hitch 130 and optical unit 140 is illustrated in FIG. 4B. Optical unit 140 consists of sensor bar 120, circuit unit 132, and battery unit 134. A wireless transmitter and all other circuitry, except the optical sensor 126, are contained in circuit unit 132. Battery unit 134 contains a battery to power optical unit 140.

Figure 5B:
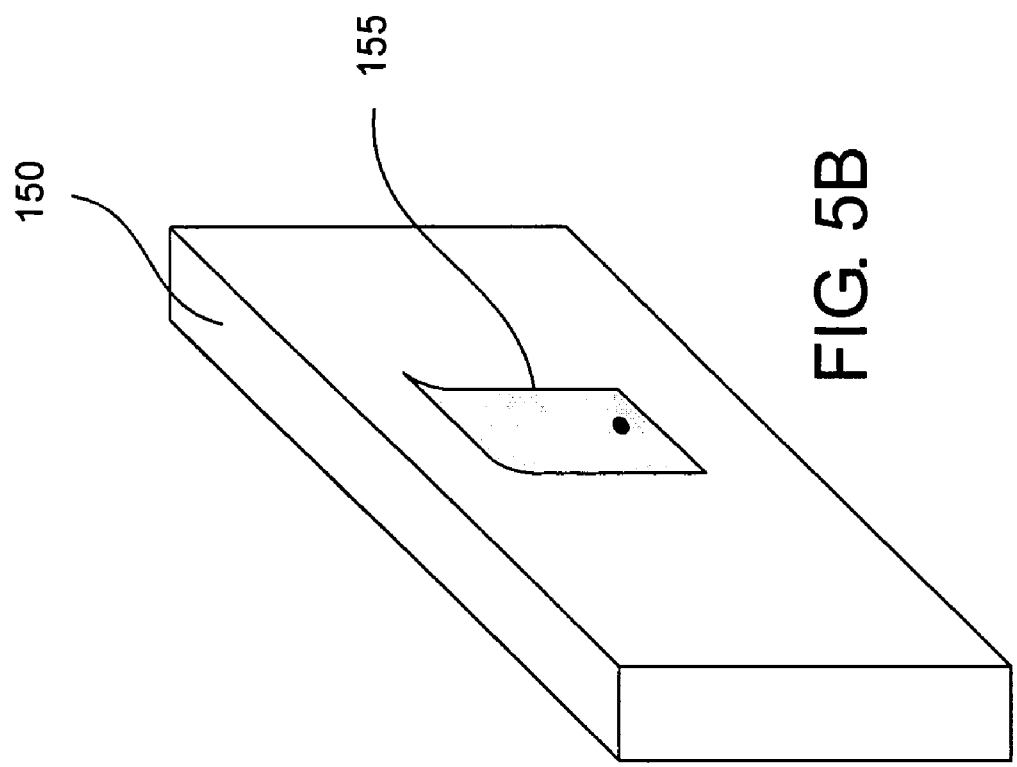
FIG. 5 illustrates the driver display unit.
Figure 5A:
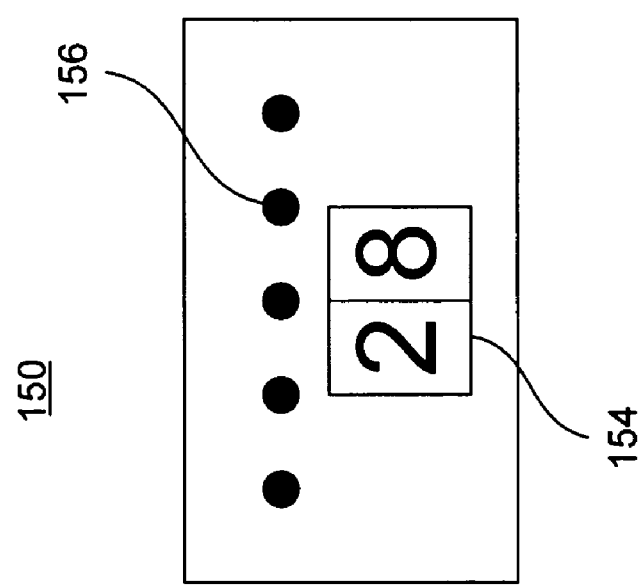

The wireless transmitter sends distance and guidance commands to driver display unit 150, illustrated in FIG. 5A, which contains a wireless receiver and battery. Remaining distance to back up is displayed as a two digit number using distance display 154. Steering guidance information is presented using horizontal steering guidance lights 156.

A green center light of steering guidance lights 156 is always illuminated and commands no change in steering (which will usually be neutral steering). Two yellow lights adjacent to the center light command slight steering in either the right or left direction (as defined by the direction of the top of the steering wheel) when illuminated. Two red outer lights command heavier steering when illuminated and aggressive steering when blinking.

Alternatively, a higher density of steering guidance lights 156 could be implemented and flashed so as to form the illusion that they were either stopped, moving to the right, or moving to the left. The direction and rate of movement would command the steering direction and aggressiveness.

Portable driver display unit 150 is positioned in front of the driver by attaching it to either the sun visor or dash. Spring clip 155 on the back of driver display unit 150 can be used for sun visor attachment as illustrated in FIG. 5B. With the driver's hand placed on top of the steering wheel, only slight hand movement in the direction of the steering guidance lights 156 is required to remain on the centerline towards the trailer. When the distance display 154 reaches zero, the hitch ball and hitch socket are in precision alignment.

Figure 6:
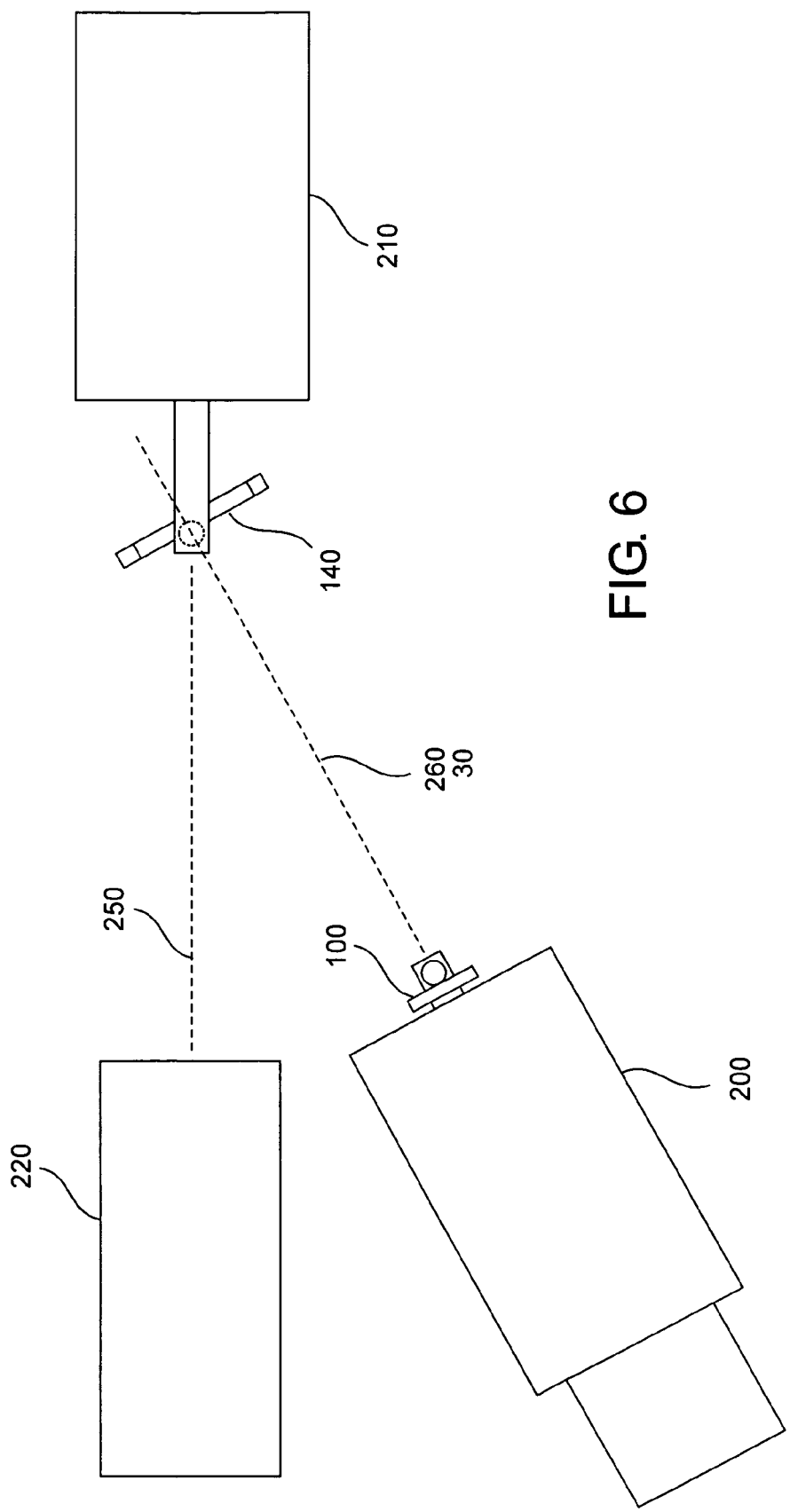
FIG. 6 illustrates the presence of an obstruction that requires the vehicle to approach the trailer from an angle.

This precision hitching invention does not require the driver to back up along the trailer centerline. As is illustrated in FIG. 6, if an obstruction 220 is present that prevents vehicle 200 from approaching on trailer centerline 250 of trailer 210, vehicle 200 can approach trailer 210 along backing centerline 260. This is possible by rotating optical unit 140 slightly in the direction of vehicle 200 so that optical axis 30 of image plane 50 in sensor bar 120 coincides with backing centerline 260. Steering guidance commands will always direct vehicle 200 along optical axis 30.

Minimal steering will always be commanded if vehicle 200 is first positioned so that it is pointing in the same direction as desired backing centerline 260. By then rotating optical unit 140 so it points directly at light bar unit 100, neutral steering will be commanded for the initial portion of the back up maneuver because vehicle 200 is already on backing centerline 260. Thereafter, only minimal steering is required to remain on backing centerline 260.

Figure 7:
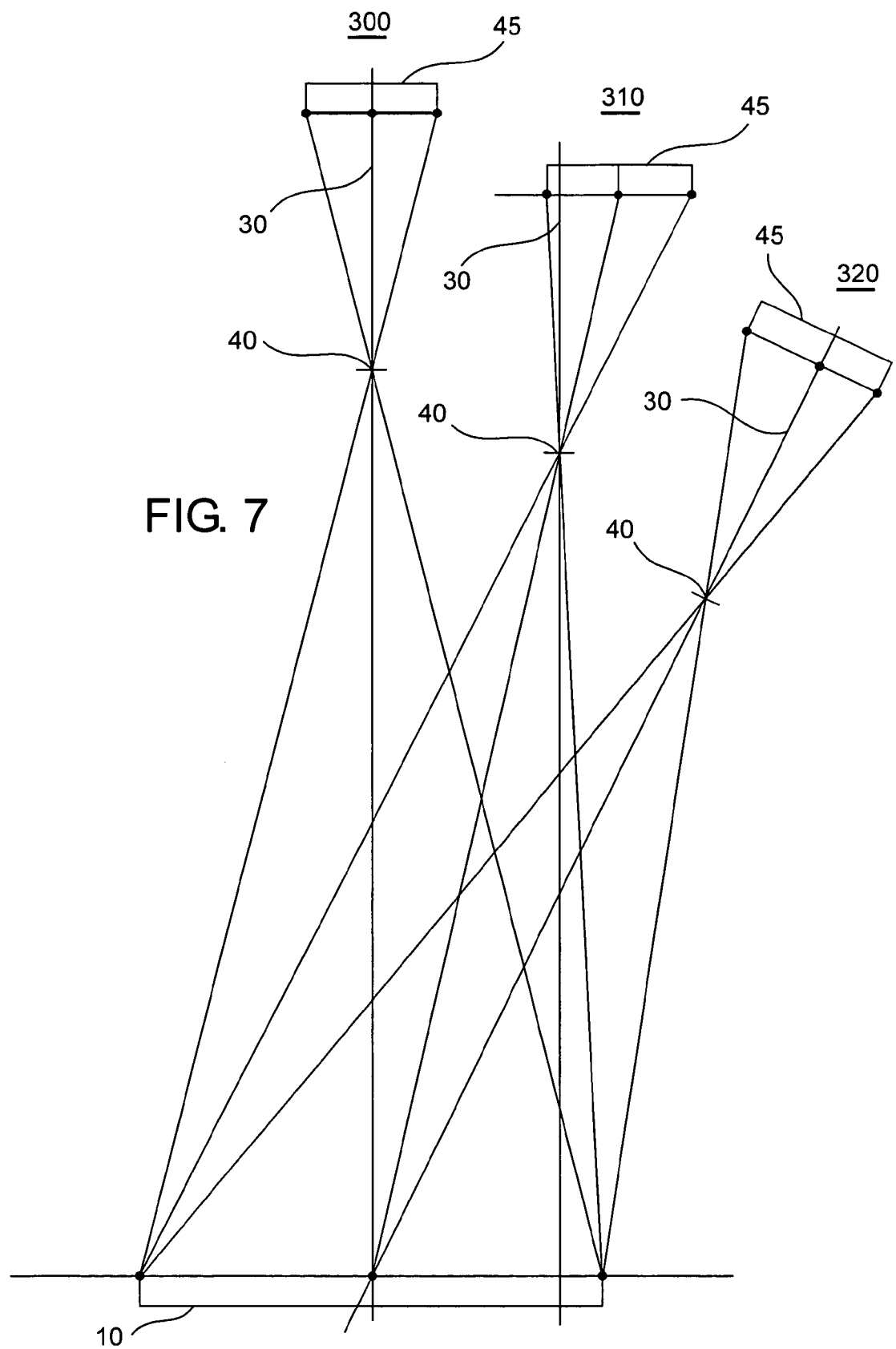
FIG. 7 illustrates consecutive positions and orientations of the vehicle during the backing process when the light bar unit is mounted on the trailer and the optical unit is mounted on the vehicle.

The positions of light bar unit 100 and optical unit 140 can be reversed so that optical unit 140 is mounted near hitch ball 110 and light bar unit 100 is mounted near hitch socket 129. The steering command criteria for this arrangement are illustrated in FIG. 7 for three positions and orientations of towing vehicle 200.

In first position 300, optical axis 30 is pointing directly at the center of known target object 10 so no steering correction is required. At second position 310, real image 45 will be offset from optical axis 30 so a steering command is created to again point optical axis 30 directly at the center of known target object 10 as illustrated at third position 320. Thus, throughout the backing maneuver, the steering command continually instructs the driver to point optical axis 30 at the trailer. However, generating the proper steering commands is complicated by two considerations that must be addressed.

The first consideration is that optical axis 30 will point in the direction of the vehicle centerline. As steering corrections are made, the vehicle centerline rotates which changes the pointing direction of optical axis 30 even though the position of vehicle 200 has not yet deviated from trailer centerline 260. Vehicle vibration and uneven road surface will continually cause real image 45 to bounce around similar to the way objects viewed through handheld binoculars and telescopes bounce around. Therefore, offsets CO of real image 45 must be averaged or filtered to reduce their jitter so that a meaningful steering command can be created.

Figure 8:
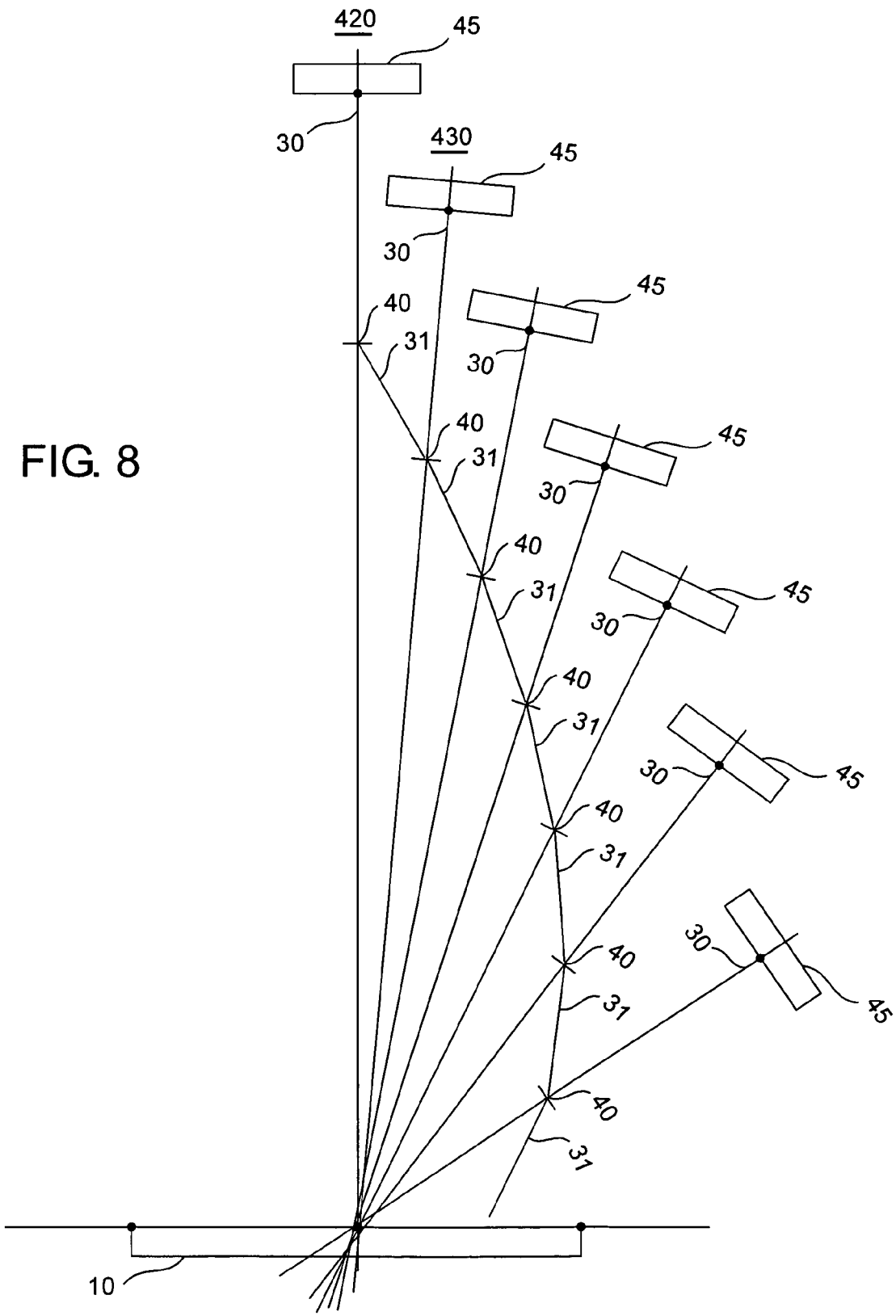
FIG. 8 illustrates the curved backing path that will result when the light bar unit is mounted on the trailer and the optical unit is mounted on the vehicle if the optical unit is not aligned with the vehicle centerline.

The second consideration is that optical axis 30 must be closely aligned with vehicle centerline 31 illustrated in FIG. 8. That is, vehicle 200 must back up along optical axis 30. If vehicle centerline 31 is offset from optical axis 30, vehicle 200 will follow the curved path created by the segments of vehicle centerline 31.

At position 420, vehicle 200 is at the desired position and rotation so steering is neutral. Upon backing up a short distance, vehicle 200 is at position 430 and rotated slightly so that optical axis 30 is still pointing at the center of known target object 10. This process of backing and steering continues which creates the curved back up path illustrated in FIG. 8.

Although the offset between optical axis 30 and vehicle centerline 31 is exaggerated in FIG. 8, it illustrates that the mounting rotation of optical unit 140 must be accurately positioned so that optical axis 30 is aligned with vehicle centerline 31. Neither vibration or mounting rotation are critical when optical unit 140 is mounted on trailer 210 because trailer 210 does not move during the hitching maneuver.

Figure 9A:
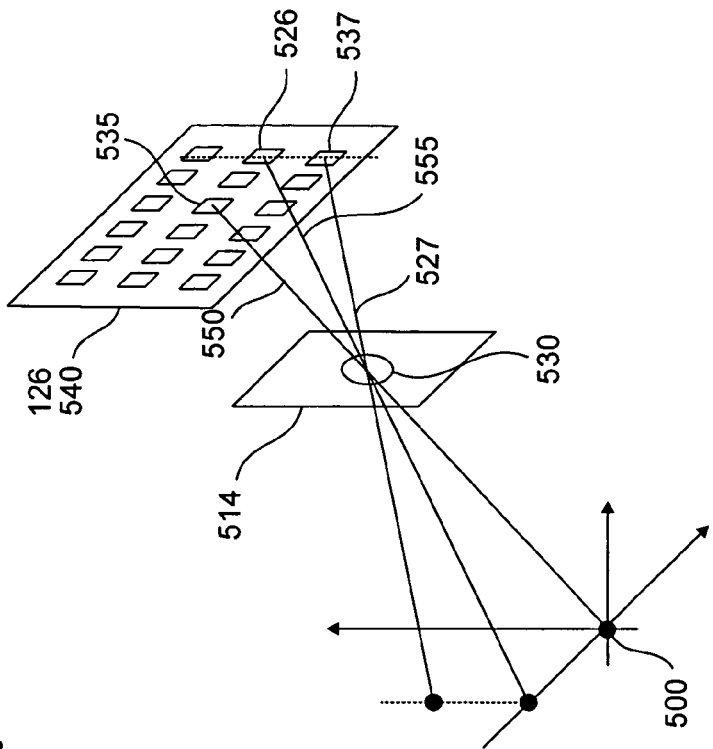
FIG. 9 illustrates the optical center produced by a pinhole, vertical slit, and lens.

FIG. 9A illustrates optical center 40 produced by either a pinhole 512 or vertical slit 510 in opaque material 514 and an optical sensor 126 implemented by linear optical sensor 520. Various known target object positions in object coordinate system 500 are projected through pinhole 512 or vertical slit 510 and are projected onto linear optical sensor 520. Linear optical sensor 520 is composed of a linear one-dimensional array of small photosensitive pixel areas 525. When light strikes a particular pixel, a voltage is generated which is detected using external sensor interface circuitry.

If optical center 40 is pinhole 512, all projections must pass through the same point. Assume that projection 550 from a known target object at the origin of object coordinate system 500 passes through pinhole 512 and strikes pixel 525. Likewise, projection 555 from another known target object on the X axis of object coordinate system 500 strikes pixel 526. Projection 527 from a known target object above the X axis strikes below linear optical sensor 520 and is not detected. However if optical center 40 is vertical slit 510, instead of pinhole 512, then projection 565 from the same known target object above the X axis does strike pixel 526 and is detected.

If optical center 40 is pinhole 512, the vertical position of light bar unit 100 is critical. If it is too high or too low, illumination from horizontal row of lights 106 will fall below or above the pixels of optical sensor 520 and not be detected. This problem can be overcome by using vertical slit 510 instead of pinhole 512.

Figure 9B:
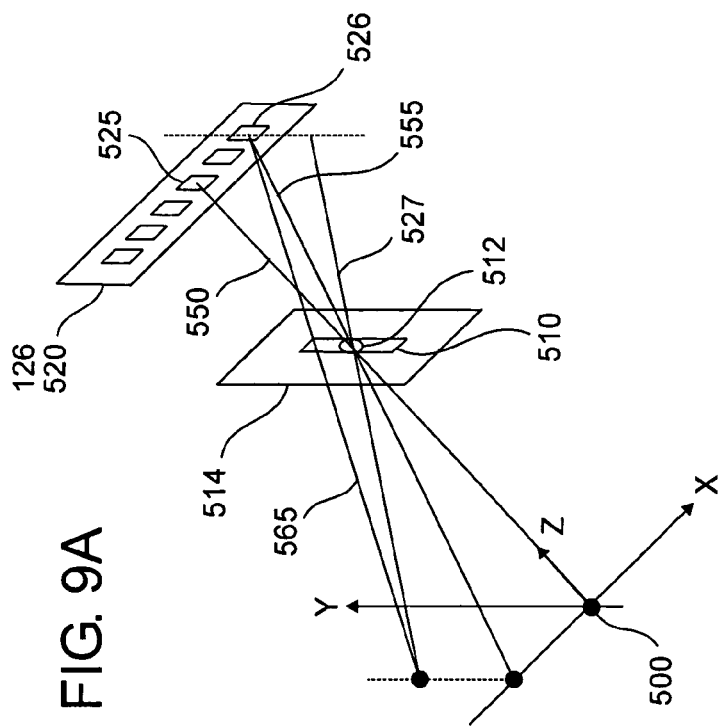

FIG. 9B illustrates optical center 40 produced by lens 530 and optical sensor 126 implemented by camera sensor 540. The same known target object positions in object coordinate system 500 are projected through lens 530 onto camera sensor 540. Camera sensor 540 is composed of a linear two-dimensional array of small photosensitive pixel areas 535. When light strikes a particular pixel, a voltage is generated which is detected using external sensor interface circuitry.

When optical center 40 is a lens, real image 45 is defined as if a pinhole were present at the center of the lens. That is, all projections pass through the center of the lens. Projection 527 now strikes pixel 537 and is detected because camera sensor 540 is composed of a two-dimensional array of pixels. Thus, using a camera sensor is similar to using vertical slit 510 with linear optical sensor 520 so that the vertical position of light bar unit 100 is not critical.

Implementing a two-dimensional camera sensor has the advantage that the vertical pixels provide high resolution vertical distance information which can be used to more precisely detect trailer hitch height before hitch ball 110 reaches trailer hitch socket 129. If trailer hitch 130 is low enough to be struck by hitch ball 110, a warning will be given to the driver by blinking distance display 154 on driver display unit 150 before hitch ball 110 actually strikes trailer hitch 130. This gives the driver the opportunity to stop and raise the hitch before continuing the backup maneuver. Trailer height warning will also be given when optical sensor 126 is linear optical sensor 520 by detecting the loss of light bar unit 100 illumination that occurs when line of sight 107 in FIG. 3 is above optical center 40 in sensor bar 120.

When linear optical sensor 520 is selected, known target object 10 is best implemented as row of lights 106. Although many types of lights and different arrangements could be implemented, bright narrow beamwidth LEDs are most appropriate. LEDs are rugged, low power, long life, and can easily be pulsed on and off. Blinking the LEDs on and off will assist in the detection of known target object 10 against a background of other objects by only processing those pixels that pulsate at the same rate as the LEDs. Bright LEDs also allow the sensitivity of the linear optical sensor to be reduced by circuit means or by reducing the optical transmission of vertical slot 510. Reducing sensitivity will mute most of the low intensity background images while leaving high intensity LED images.

The two outer lights of row of lights 106 illustrated in FIG. 4A are designed to provide good distance resolution at long ranges due to their wide spacing. At short ranges, the two outer lights will be outside the horizontal field of view of optical sensor 126. The purpose of the two inner LEDs adjacent to the center LED is to provide distance measuring capability at very short ranges by remaining within the horizontal field of view of optical sensor 126. The center LED is optional and may simplify or improve steering guidance information. By blinking the center LED out of phase with the other LEDs, steering guidance can be calculated during the period when only the center LED is illuminated.

When camera sensor 540 is selected, known target object 10 can be implemented using a variety of other known target objects. FIG. 10 illustrates a rectangular bar code known target object 600 attached to the front of hitch ball 110 mounted on vehicle tow mount 112. A thick separated pattern 610 is provided for long distances and a single thin pattern 620 is provided for short distances where pattern 610 exceeds camera sensor 540 horizontal field of view. The known bar code like pattern will identify real image 45 of known target object 600 as the correct known target object 10.

As pixel resolution increases and cost decreases for camera sensor chips, known target object 10 could consist of hitch ball 110 itself. Using appropriate pattern recognition software, the image of hitch ball 110 could be identified against background images as the correct known target object 10. Many camera sensor modules also contain image stabilization features which may remove any vehicle 200 vibration when optical unit 140 is mounted on hitch ball 110.

Figure 11A:
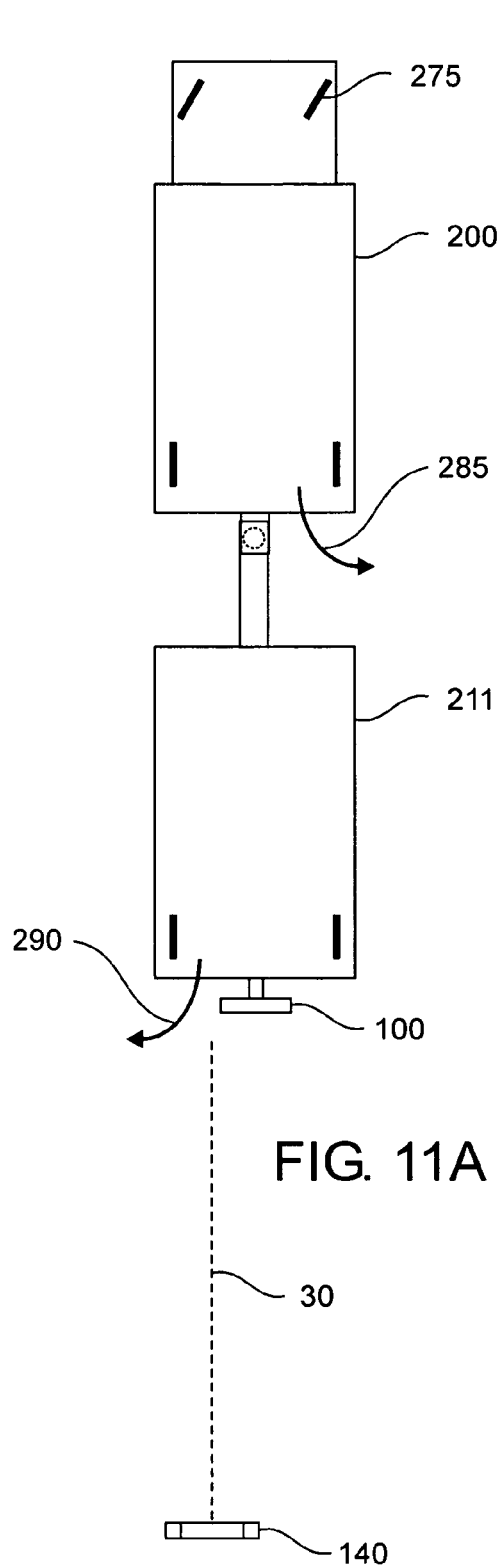
FIG. 11 illustrates the backing up of two types of hitched trailers.
Figure 11B:
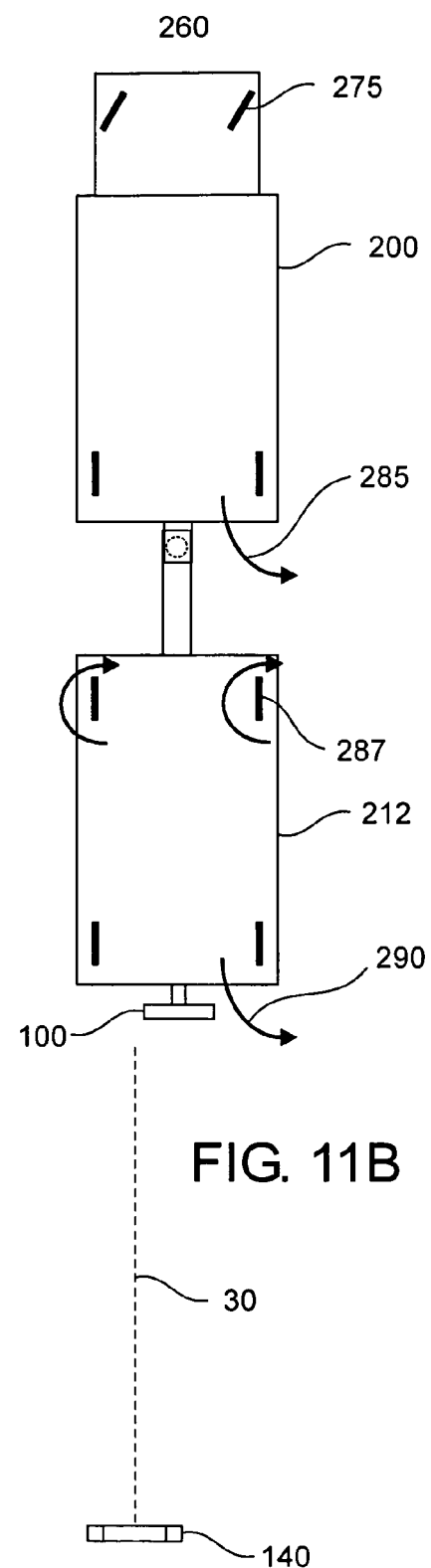

This invention can also be used to back up hitched trailers as illustrated in FIG. 11A. Light bar unit 100 is placed on the rear of fixed wheel trailer 211, optical unit 140 is placed at the desired backup location, and the sense of the steering command is reversed for fixed wheel trailer 211. To move fixed wheel trailer 211 to the left, vehicle wheels 275 of vehicle 200 are steered to the right which moves vehicle 200 to the right and fixed wheel trailer 211 to the left. To move steered wheel trailer 212 to the right, vehicle wheels 275 are steered to the right which moves the vehicle 200 to the right. This vehicle movement steers wheels 287 and steered wheel trailer 212 to the right.

Optical unit 140 can be positioned using a tripod, mounting it to a wall, or any other means. If the desired backup path is not straight, optical unit 140 can be re-positioned for each segment in a series of straight-line backup segments along the desired path. A switch on optical unit 140 can be implemented to modify the steering guidance sensitivity and direction if desired. Alternatively, the driver can simply be instructed to place the driver's hands on the bottom of the steering wheel and move them in the direction of steering guidance lights 156 of driver display unit 150 when backing up a hitched fixed wheel trailer.

Block diagram 700 of the driver display unit 150 is illustrated in FIG. 12. Antenna 710 and wireless receiver 720 obtain distance and steering guidance signals transmitted by optical unit 140. Processor 730 interfaces to wireless receiver 720 and converts it's output to distance display 740 and steering display 745 illumination signals. The unit is turned on and off using switch 750 and is powered by battery 760.

Block diagram 800 of light bar unit 100 is illustrated in FIG. 13. Processor 810 drives and blinks the various LEDs 820. Light bar unit 100 is turned on and off using switch 830 and is powered using battery 840.

Figure 14:
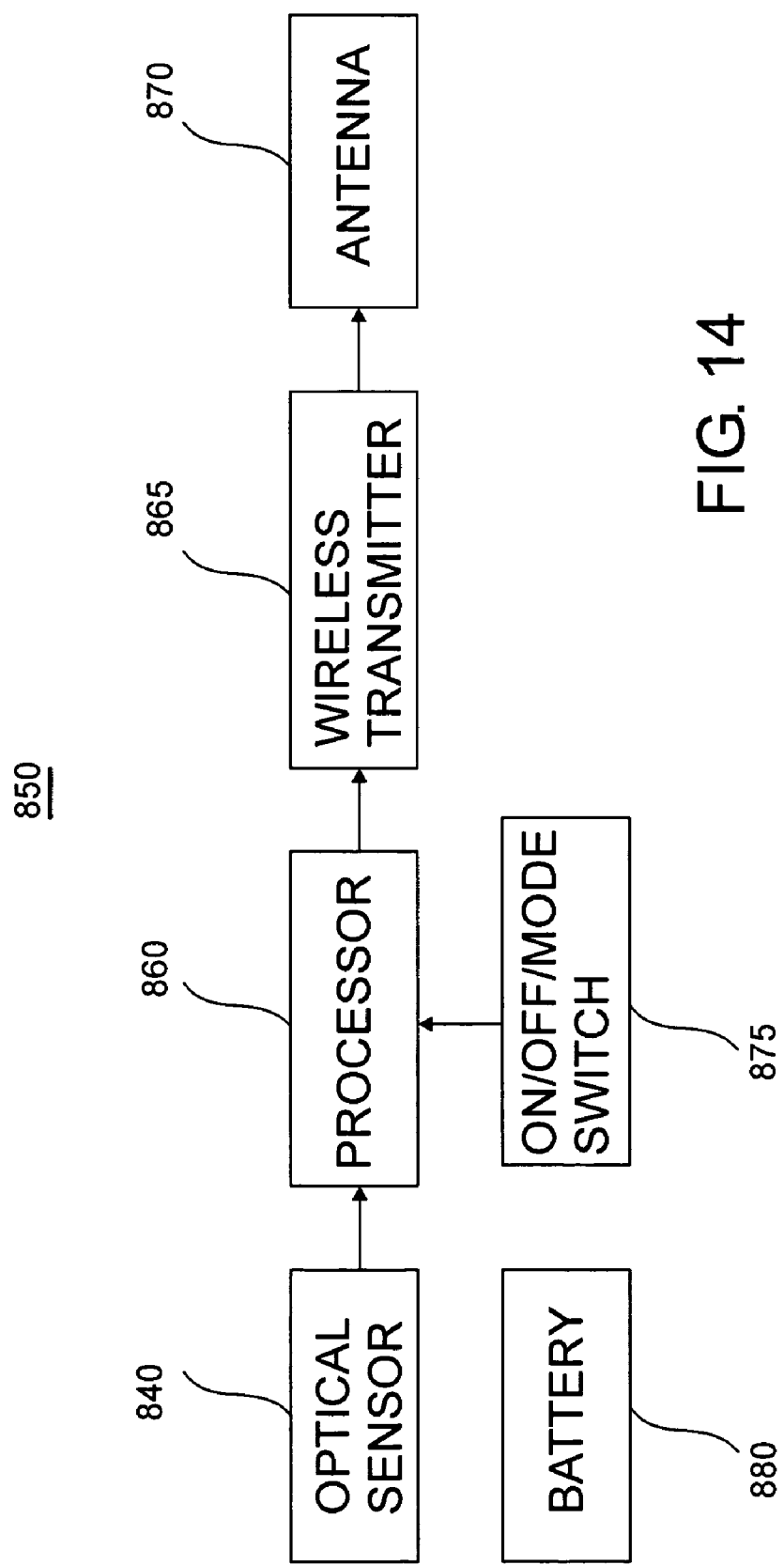
FIG. 14 illustrates a block diagram of the optical unit.

Block diagram 850 of optical unit 140 is illustrated in FIG. 14. Pixel amplitude information from optical sensor 840 is processed by processor 860 to identify known target object 10, calculate distance and steering commands, and format those commands for wireless transmitter 865. Wireless transmitter 865 converts this information into wireless signals which are transmitted using antenna 870. The unit is turned on and off using switch 875 which optimally also selects hitching, fixed wheel trailer backing, or steered wheel trailer backing modes. The unit is powered using battery 880.

Figure 15:
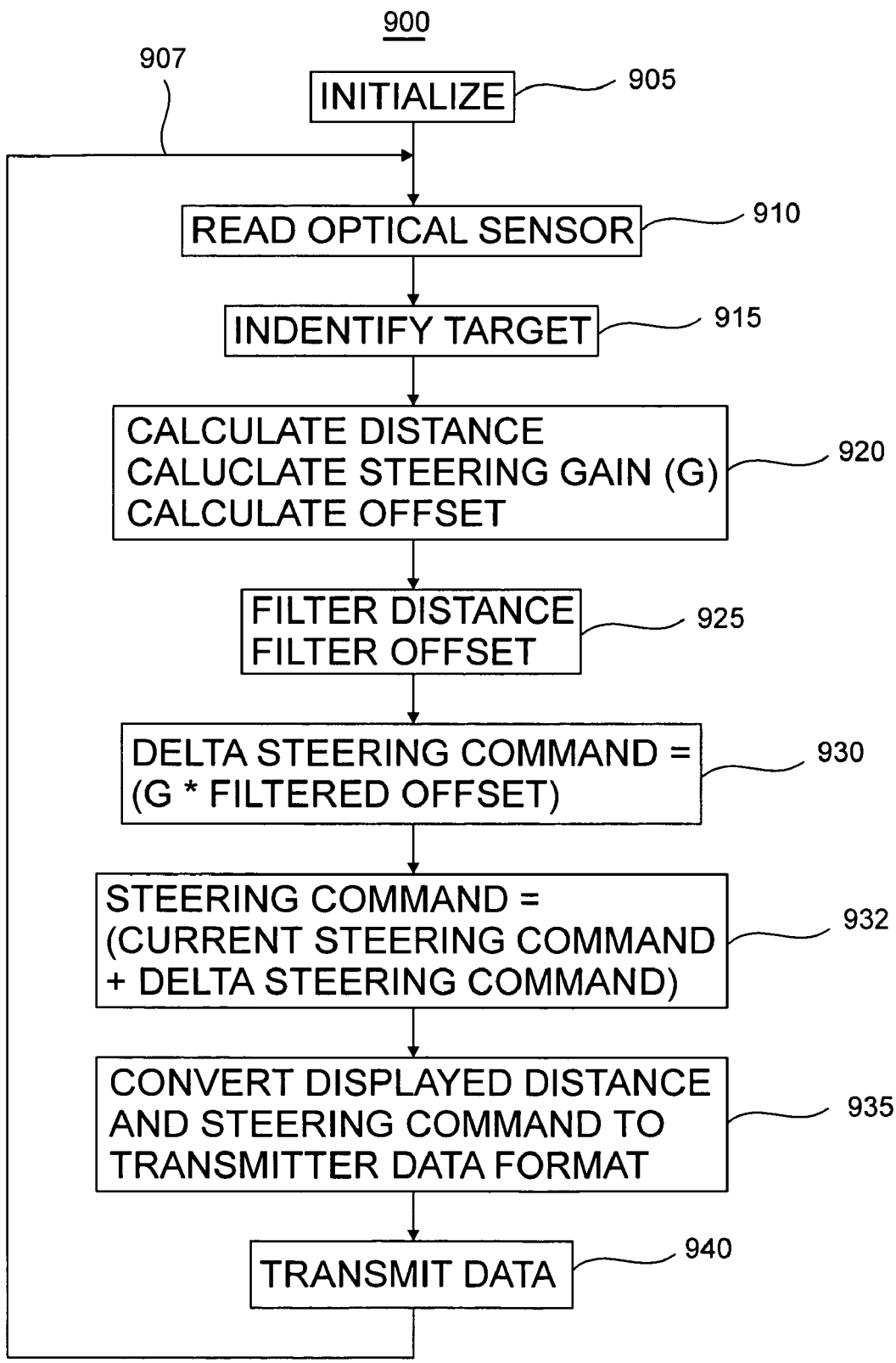
FIG. 15 illustrates a software flowchart for the optical unit processor.

Software flowchart 900 for processor 860 is illustrated in FIG. 15. After power-up initialization 905, continuous loop 907 is entered. Optical sensor 126 is read 910 and pixels from known target object 10 are identified 915. Distance, offset, and steering loop gain (G) are calculated 920 from known target object 10 real image 45 width and offset in pixels. This data is filtered 925 for each iteration of continuous loop 907. A delta steering command is calculated 930 based on steering loop gain and offset and added to the current steering command 932. The updated distance and steering guidance information is converted to transmitter data format 935 and transmitted 940.

The display resolution will vary with range. At long ranges, the integer resolution will be on the order of 1 foot. At short ranges, the integer resolution will be on the order of one-quarter inch. In this way, the sensitivity of the distance display will increase as the vehicle approaches the trailer and will allow the driver to align hitch ball 110 to approximately one-quarter inch (one integer on the display) of trailer hitch socket 129.

If the bottom of trailer hitch 130 is not of sufficient height above the top of hitch ball 110, illumination from known target object 10 will be blocked from view of optical sensor 126 at close range. This loss of illumination will command the processor to blink the displayed distance 154 on driver display unit 150 to alert the driver to stop and raise the hitch.

Although the preferred embodiments of the present invention have been illustrated and described in detail, it will be readily apparent to those skilled in the art that various modifications may be made therein without departing from the spirit of the invention.

For example, many options are available for processors, displays, enclosures, and mounting. Low cost microcontrollers, microprocessors, DSPs, and FPGAs are currently available and many have adequate resources to be used in this invention. Both LED and LCD displays are available for the driver display. Both metal and plastic enclosures are available from various suppliers. Magnetic, clip, Velcro, straps, etc. are some of the many ways available to mount the enclosures to the vehicle and trailer.

There are many low cost wireless choices currently available and more are being added every year. However, to reduce cost and complexity, optical unit 140 could be mounted on the vehicle and wired directly to driver display unit 150.

There are also many CMOS and CCD linear optical sensors and camera sensors available with pixel resolutions adequate to provide the close range one-quarter inch distance resolution desired for this invention. For example, a typical optical sensor pixel separation is on the order of 10 micrometers. If FD in FIG. 2 is one inch and CO is one pixel, then the resolution of known target object 10 offset from optical axis 30 is approximately 0.1 inch at 20 feet. Sensor focus and optical distortion are not significant issues in this invention because the processor software can easily compensate for any of these effects on distance and offset. Thus, this invention is capable of providing precision trailer hitching and backing distance and guidance information.

Although this invention has been described for trailer hitching and backing, it can also be used in many other movable known target object applications where precision distance and guidance information is desired or required.

For example, when docking a large houseboat (or other large boat) in a narrow slip, it is mandatory to accurately align the boat with the centerline of the slip far in advance of actually reaching the entrance to the slip. By mounting optical unit 140 at the back of the slip and target unit 90 on the boat, slip centerline guidance can be obtained early in the docking maneuver while the boat still has time to make steering corrections.

What is claimed is:

1. A method for providing guidance to a vehicle when hitching up to a trailer, said method comprising:
   placing a known target object on one of said vehicle and said trailer and an optical sensor on the other of said vehicle and said trailer;
   projecting said known target object through an optical center to produce a real image on an image plane of said optical sensor located behind said optical center, wherein an image plane optical axis is normal to said image plane at an image plane origin;
   determining a distance between said vehicle and said trailer in response to a size of said real image on said image plane;
   determining a vehicle offset from said optical axis in response to said real image offset from said image plane origin; and
   providing said guidance to said vehicle in response to said distance and said vehicle offset.

2. The method as claimed in claim 1 wherein said known target object contains one or more lights.

3. The method as claimed in claim 2 wherein one or more of said one or more lights are flashing.

4. The method as claimed in claim 1 wherein said optical center is a narrow slit and said optical sensor is a linear optical sensor composed of a one-dimensional array of small photosensitive pixels.

5. The method as claimed in claim 1 wherein said optical center is a pinhole or lens and said optical sensor is a camera sensor composed of a two-dimensional array of small photosensitive pixels.

6. The method as claimed in claim 1 wherein said known target object is a bar code object.

7. The method as claimed in claim 1 wherein said known target object is a trailer hitch ball.

8. The method as claimed in claim 1 wherein said guidance to said vehicle consists of a steering direction and intensity command and a said distance indication.

9. The method as claimed in claim 8 wherein said steering direction and intensity command is a relative steering command responsive to current said steering command, an actual response of said vehicle to said steering command, said distance, and said vehicle offset.

10. The method as claimed in claim 8 wherein sensitivity of said distance indication increases as said distance decreases.

11. The method as claimed in claim 1 wherein said guidance to said vehicle includes a warning indication if trailer hitch needs to be raised.

12. The method as claimed in claim 1 wherein said vehicle hitching path is selected by pointing a direction of said optical axis.

13. A method for providing vehicle guidance when backing up a hitched trailer, said method comprising:
   placing a known target object on one of said trailer a backup destination and an optical sensor at the other of said trailer and said backup destination;
   projecting said known target object through an optical center to produce a real image on an image plane of said optical sensor located behind said optical center, wherein an image plane optical axis is normal to said image plane at an image plane origin;
   pointing said optical axis along desired backup path;
   determining a distance between said trailer and said backup destination in response to a size of said real image on said image plane;
   determining a vehicle offset from said desired backup path in response to a real image offset from said image plane origin; and
   providing guidance to said vehicle in response to said distance and said vehicle offset.

14. An apparatus for providing guidance to a vehicle when hitching to a trailer, said apparatus comprising:
   a target unit mounted on one of said vehicle and said trailer and an optical unit mounted on the other of said vehicle and said trailer;
   wherein said target unit includes a known target object;
   wherein said optical unit includes an optical center mounted in front of an optical sensor, said optical center projecting a real image of said known target object on an image plane of said optical sensor, wherein an image plane optical axis is normal to said image plane at an image plane origin;
   the apparatus further comprising an optical unit processor in communication with said optical sensor;
   wherein said optical unit processor determines distance between said vehicle and said trailer in response to a size of said real image on said image plane;
   wherein said optical unit processor determines a vehicle offset from said image plane optical axis in response to a real image offset from said image plane origin; and
   the apparatus further comprising a driver display unit in communication with said optical unit and providing said guidance to said vehicle in response to said distance and said vehicle offset.

15. The apparatus as claimed in claim 14 wherein said target unit comprises:
   one or more lights configured as said known target object;
   the apparatus further comprising a target unit processor configured to drive said one or more lights in either a continuous or flashing manner.

16. The apparatus as claimed in claim 14 wherein said optical unit comprises:
   a slit configured to project said real image of said known target object on said image plane of said optical sensor;
   a one-dimensional array of small photosensitive pixels configured as said image plane of said optical sensor;
   wherein said optical unit processor is configured to receive optical sensor data in response to said real image, configured to generate guidance data in response to said optical sensor data, and configured to format said guidance data for transmission to said driver display unit.

17. The apparatus as claimed in claim 14 wherein said optical unit comprises:
   a lens configured to project said real image of said known target object on said image plane of said optical sensor;
   a two-dimensional array of small photosensitive pixels configured as said image plane of said optical sensor;
   wherein said optical unit processor is configured to receive optical sensor data in response to said real image, configured to generate guidance data in response to said optical sensor data, and configured to format said guidance data for transmission to said driver display unit.

18. The apparatus as claimed in claim 14 wherein said driver display unit comprises:
- a digital display configured to display a distance indication, wherein said distance indication sensitivity increases as said distance decreases;
- a row of steering guidance lights configured to indicate steering direction and intensity, wherein said steering direction and intensity is a relative steering command responsive to a current steering command, an actual response of said vehicle to previous steering commands, said distance, and said vehicle offset.

19. The apparatus as claimed in claim 14 wherein said driver display unit is in said communication with said optical unit by wireless radio.

20. The apparatus as claimed in claim 14 wherein:
- said target unit includes a bracket and a hold down spring for removable attachment to a hitch ball;
- said optical unit includes a bracket and at least one magnet for removable attachment to a hitch socket; and
- said driver display unit includes a spring clip for removable attachment to a conventional sun visor within said vehicle.

\* \* \* \* \*